R. W. SHREWSBURY.
APPARATUS FOR TRANSPORT OF MATERIAL.
APPLICATION FILED JUNE 12, 1908.

920,196.

Patented May 4, 1909.
6 SHEETS—SHEET 1.

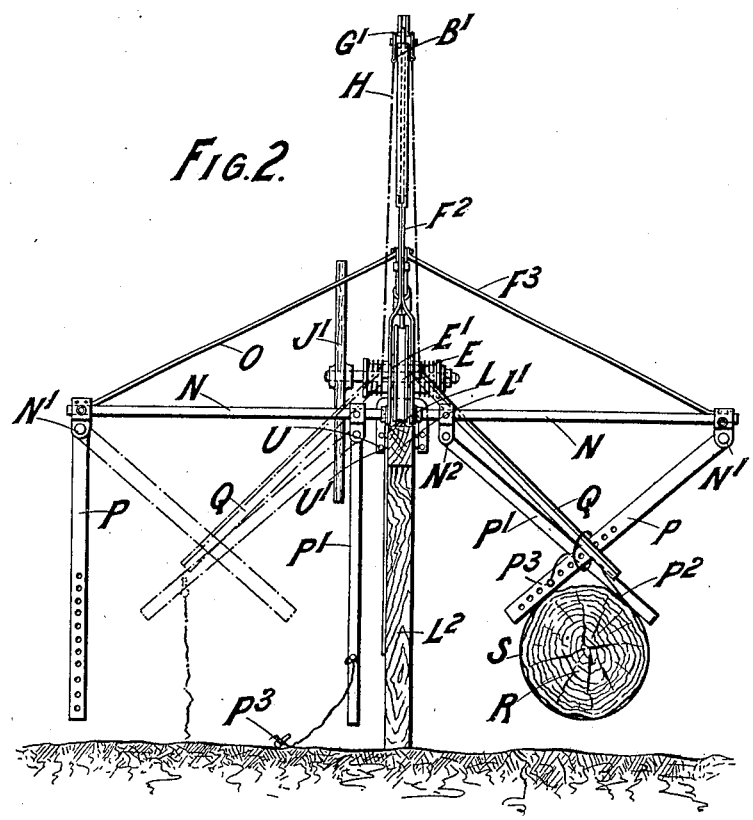

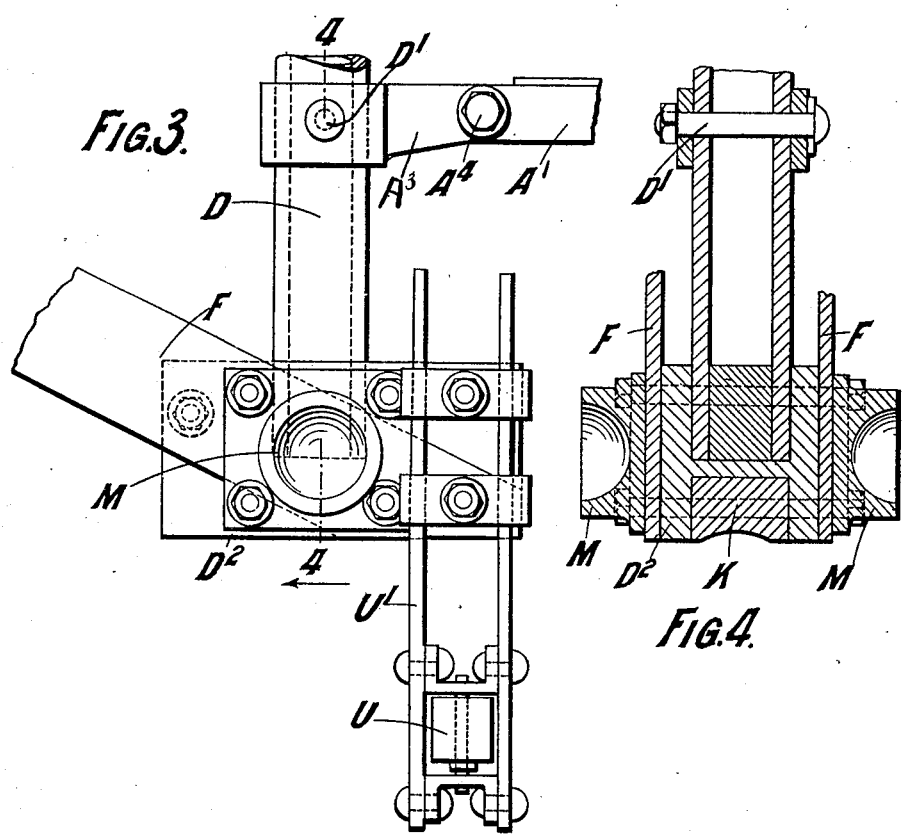

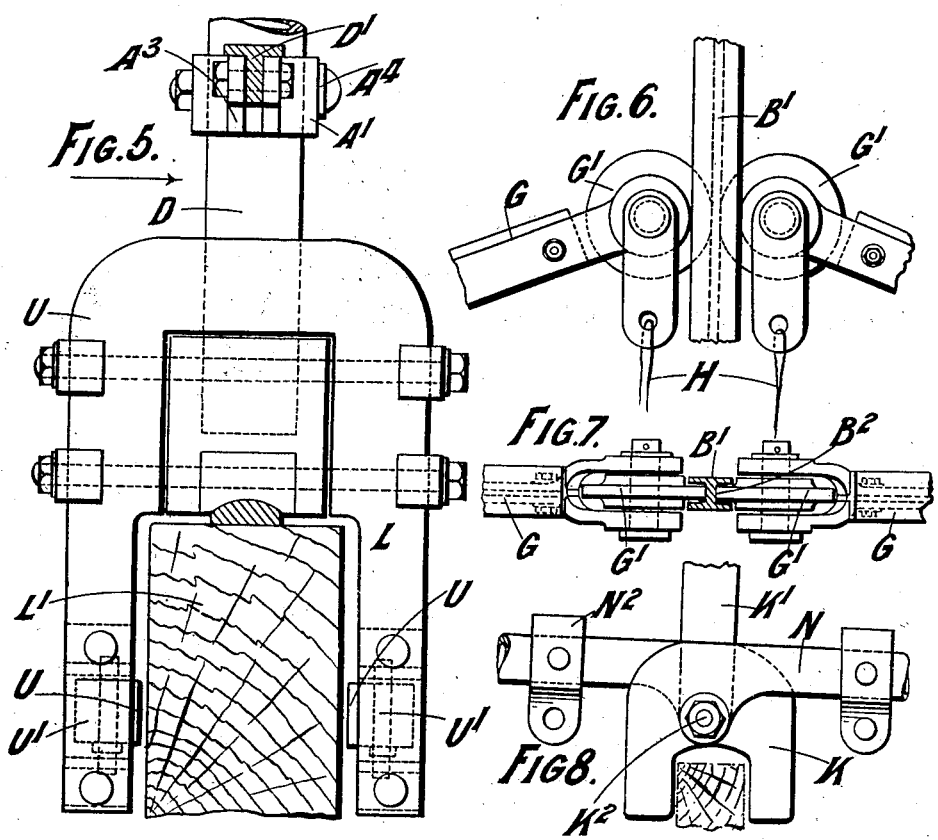

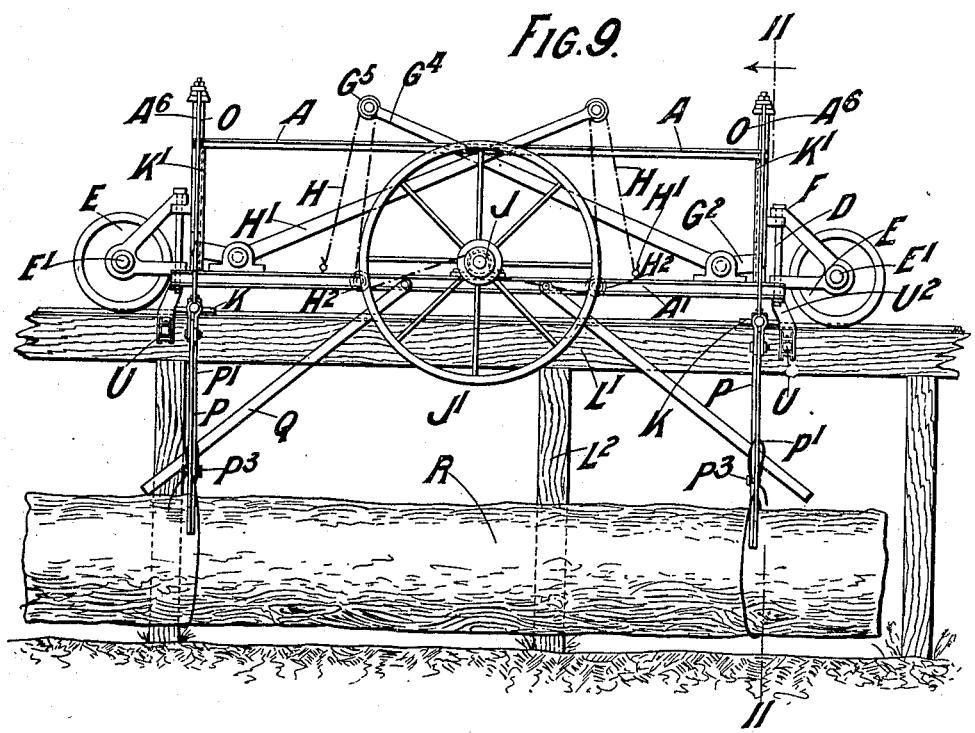

R. W. SHREWSBURY.
APPARATUS FOR TRANSPORT OF MATERIAL.
APPLICATION FILED JUNE 12, 1908.

920,196.

Patented May 4, 1909.
6 SHEETS—SHEET 6.

UNITED STATES PATENT OFFICE.

RICHARD WILLIAM SHREWSBURY, OF LONDON, ENGLAND.

APPARATUS FOR TRANSPORT OF MATERIAL.

No. 920,196.          Specification of Letters Patent.          Patented May 4, 1909.

Application filed June 12, 1908. Serial No. 438,210.

*To all whom it may concern:*

Be it known that I, RICHARD WILLIAM SHREWSBURY, a subject of the King of England, residing at London, in England, have invented certain new and useful Improvements in Apparatus for the Transport of Material, of which the following is a specification.

The present invention relates to that class of apparatus which is adapted to run on a single rail the material to be conveyed which for example may be logs of wood ordinary goods or passengers being attached to or suspended from the framework of the car on either side of the rail.

According to this invention the apparatus comprises a central frame and two end portions or trucks each carried on a single wheel these trucks being pivotally connected to the central framework and in one construction also arranged so that the whole of each truck can be rocked in a fore and aft direction about the wheel axle. Lateral load supporting members are provided and so connected to brake mechanism that the weight of the load is transmitted to the brake blocks constantly tending to apply them to the braking surface suitable mechanism being provided for raising the load and maintaining the brakes in the off position. In the construction where each truck is mounted so as to rock, a brake block is connected to this frame in such a way that when the truck frame is rocked in one direction the load carrying members which are connected to the truck are raised together with the brake block which is lifted off the braking surface which is preferably the rail. On releasing the brake operating mechanism the load acting on the truck causes it to rock and bring the brake block down on the rail. In an alternative construction the brake block is mounted on a vertically movable rod to which is connected the load carrying members. The brake rod together with the load is raised by suitable mechanism operated by hand or power. The load is suspended from lateral arms from each of which is pendent two members pivoted to the arm in such a way that these pendent members can be crossed over the load. A third member constituting a stay which coöperates with each pair of crossed arms is pivoted to the frame of the apparatus. Each group of three members are connected together and to the load by a lashing in some convenient manner.

Figure 1:
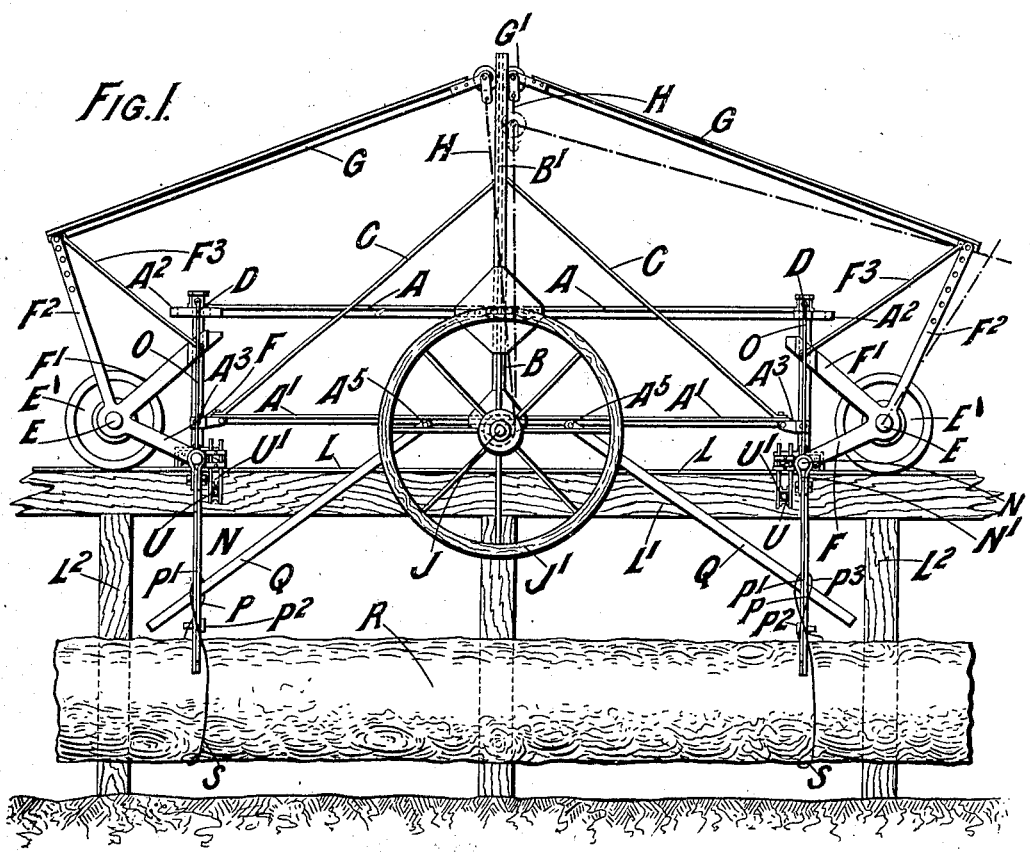
Figure 10:
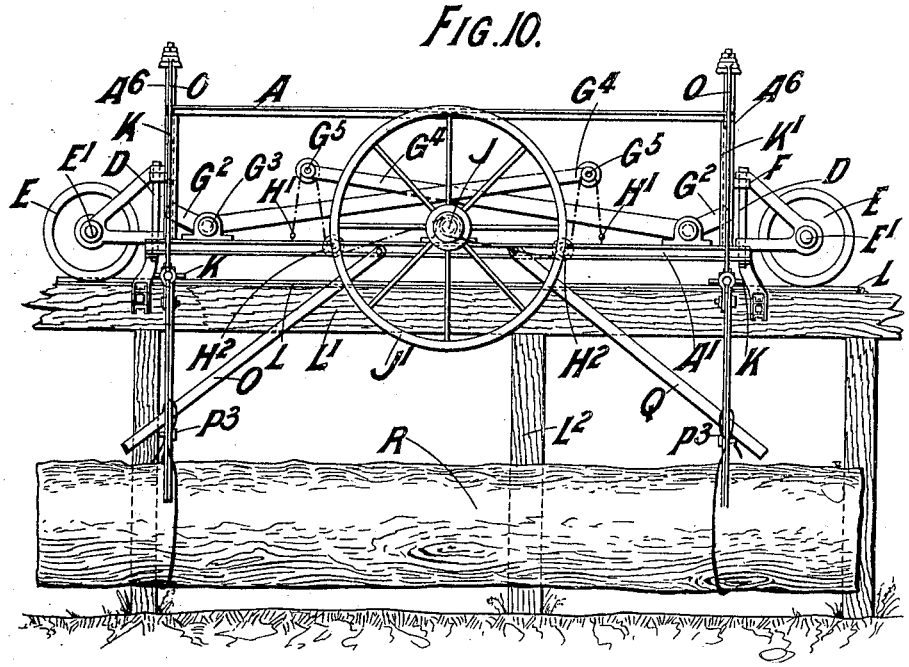
Figure 11:
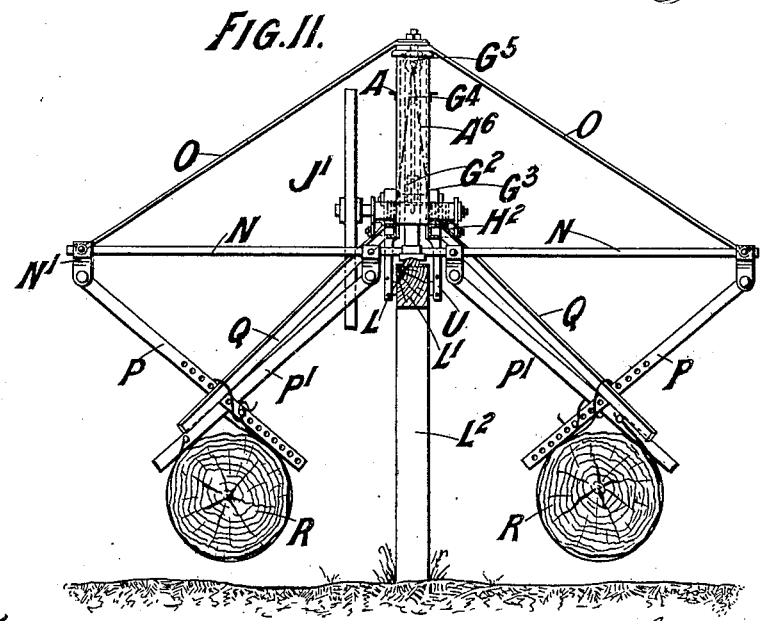

In the accompanying drawings, Figure 1 is a side elevation of one form of transport apparatus constructed in accordance with this invention. Fig. 2 is an end elevation. Fig. 3 is a side elevation on an enlarged scale of the parts adjacent to the brake block. Fig. 4 is a section on the line 4—4 of Fig. 3. Fig. 5 is an end elevation of the parts shown in Fig. 3. Fig. 6 is a side elevation of a detail. Fig. 7 is a plan of the same. Fig. 8 is an elevation of a modified form of brake block. Fig. 9 is a side elevation of a modified form of transport device. Fig. 10 is a similar view showing the parts in a different position. Fig. 11 is an end elevation partly in section on the line 11—11 of Fig. 9.

Like letters indicate like parts throughout the drawings.

In the construction shown in Figs. 1 and 2 the main frame of the apparatus is formed of two horizontally arranged parallel members A and A′ disposed one above the other with a central vertical member B connecting them, an extended portion B′ thereof projecting upwardly about the center of the frame. This projecting portion B′ is stayed by rods or wires C to the ends of the lower horizontal member A′. The points of connection between the members A A′ and the member B are conveniently strengthened by plates such as shown in Fig. 1 or in some other convenient manner. Each end of the upper horizontal member A is forked as at A² and each end of the lower horizontal member A′ is provided with a collar or sleeve A³ pivotally connected or hinged at A⁴ to the member A′. Each end of the apparatus is constructed substantially similar the following description being therefore confined to one end with its truck. A rod D conveniently formed tubular constituting a pivot for the truck passes through the collar A³ to which it is rigidly secured by a pin D′ or otherwise. The upper end of the rod D lies between the arms of the fork A². The arrangement is such that the truck can turn about the rod D while the latter can rock in a fore and aft direction with the collar A³ being guided at its upper end by the fork A². The axle E of the wheel E′ is carried in a frame comprising three radiating members of which the lower one F is connected rigidly to a block D² which is free to turn on the lower end of the pivot D. The end of the intermediate member F′ embraces the rod D toward its upper end though conveniently below that part of the rod D which lies in the fork A². The connection between the member F' and the pivot D is such that the member F' can freely turn on the pivot D. The third member F² of the truck frame projects upwardly in the same plane as the members F F' and the rod D but directed outwardly away from the rod D. A stay rod or wire F³ connects the end of the member F² to the member F'. A rod G is pivotally connected to the end of the truck frame member F² and at the opposite end of this rod G is carried in some convenient way a roller G' which is adapted to run in a groove B² formed in the central frame member B'. To the inner end of the rod G carrying the roller is attached a cord chain or the like H which passes down and around the drum of a windlass or the like carried on a spindle J mounted on the main frame conveniently at or about the center of the lower frame member A'. A hand wheel J' enables this windlass barrel to be rotated so as to draw downward the inner end of the rod G some catch being provided to enable the windlass to be locked or released when desired. The cords controlling each rod G may be wound around the same drum but preferably they are carried on separate drums disposed on opposite sides of the frame. On the underside of the block D² is mounted a brake block K adapted to bear on the rail L.

The operation of the brake mechanism is as follows: When the brake is applied to the rail the pivot D truck frame F F' F² and rod G are all in the positions shown in Fig. 1. If now the hand wheel J' be rotated the inner end of the rod G is drawn downward with the result that the end of the truck frame member F² is forced downward thereby rocking the truck frame about the wheel axle E. The rocking of the truck frame raises the member F of this frame together with the block D² thus lifting the brake block K off the rail. The nature of the connection between the collar bearing A³ and the lower frame member A' allows the pivot rod D to move in the above mentioned manner the upper end of this pivot being guided as previously described in the forked or slotted end A² of the frame member A. Upon releasing the hand wheel J' or otherwise slackening the cords H each truck frame rocks inward again into the position shown in Fig. 1 this motion taking place under the influence of the weight of the central frame and the weight of the load which is suspended therefrom in the manner to be hereinafter described. The brakes and brake blocks K are thus applied with the necessary force to the rail.

The chain lines in Fig. 1 indicate the position of the truck frame member F² and the rod G when the inner end of the latter has been drawn down to the extent necessary to take the brake block fully off the rail. The truck frame members F F' F² are double or forked so as to lie on either side of the wheels E'. The connection between the truck members F F' and the pivot D will be seen to be such that the truck frame can turn about the pivot pin D the lower end of which moves in the block D² which forms a bearing. The upper bearing is formed by the embracing of the pivot D by the truck frame member F'.

At the sides of the block D² are mounted hemispherical sockets M. In each of these sockets lies the correspondingly shaped end of a rod N which projects laterally from the apparatus. The outer end of this rod N is slung preferably from the upper end of the pivot D by a wire cord chain or the like O. The joint between the inner end of the load carrying rod N and the frame is such as to allow the rod N universal movement about this joint. Pivoted at N' to the outer end of the rod N is a bar P a second bar P' being similarly pivoted at N² toward the inner end of the rod N. The point of connection between the bar P' and the rod N is conveniently adjustable as for example by forming the pivot N² on a clamp which can be moved along the rod N and secured at any desired place. A bar Q has one end connected by some form of pivot or universal joint to the lower frame member A' as at A⁵. It will thus be seen that the bars P P' and Q can be adjusted so as to cross each other at various heights and at different distances from the center of the apparatus. In attaching a load for example a log of wood R to the apparatus the bars P P' and Q are crossed and allowed to drop on to the log R which has previously been positioned in the manner described above so that it will approximately balance the load carried on the opposite side of the apparatus. The three bars P P' and Q thus take up their own position and in this position are secured together and to the log R by means of a tie cord or lashing S one end of which is connected for example at P² to the bar P'. This lashing is passed around the log R and then carried around the point of intersection of the bars P P' and Q the end of this lashing being secured in some convenient manner as at P³ to the bar P by a peg hook or other device which will allow of the lashing to be readily freed. The arrangement is clearly shown on the right hand side of Fig. 2 while on the left hand side of the same figure the bars P P' are shown pendent from the rod N before they have been crossed prior to the attachment of a load.

In the modified construction shown in Figs. 9, 10 and 11 in place of the truck frames being constructed so as to rock with relation to the main frame these truck frames which comprise in this instance only two members F F' are rigidly connected to the pivot pin D. This pin is carried in bearing brackets on an upright hollow member A⁶ rigidly connecting the end of the upper frame member A to the corresponding end of the lower frame member A'. The brake block K is mounted on the end of a rod K' which lies within and passes through the hollow member A⁶. A slot is formed at a convenient point in this brake rod K' and with this slot engages the end of the short arm G² of a two-armed lever pivoted at G³ on the lower frame member A'. The longer arm G⁴ of this lever is provided at its ends with a pulley G⁵ over which passes the controlling cord H. This cord has one end secured at H' to the frame member A' and after passing around the pulley G⁵ is carried around a pulley H² on the frame and thence to the windlass barrel. The inner ends of the load carrying rods N are socketed on the brake block K the suspension wire O being attached to the upper end of the brake rod K' where it projects beyond the upper end of the hollow frame member A⁶. The operation of the mechanism in this construction is as follows:—When the brakes are applied the cords H are of course slackened and the brake rods K' together with the brake blocks K and the lateral members N with the loads suspended therefrom are free to drop to the extent necessary to bring the brake blocks K on to the rail. The arms G⁴ of the brake operating levers are under these conditions raised the several parts assuming the positions shown in Fig. 9. If now the hand wheel J' be rotated and the cords pulled upon the ends of the lever arms G⁴ are drawn down the short arms G² of these levers thus raising the brake rods K' and with them the load and of course simultaneously taking the brake blocks K off the rail. When the cord has been wound up to the extent necessary to raise the brake blocks a convenient distance off the rail the hand wheel is locked and the parts remain in the positions in which they are shown in Fig. 10. To give ease in working the end of the short lever arm G' conveniently carries a roller which lies in the slot in the brake rod K' and bears against the upper end of this slot when the brake operating levers G² G⁴ are utilized to raise the brakes and load. The slot in the brake operating rod K' may be shaped as found most convenient to insure smooth working of the parts.

In order to give lateral steadiness to the ends of the frame it is convenient to provide guide rollers which bear against the side of the rail. These rollers U are mounted on a horseshoe shaped frame U' which is bolted to the block D² in the construction shown in Figs. 1 to 7. In the construction shown in Figs. 9, 10 and 11 the rollers U are carried on brackets U² bolted to the ends of the lower frame member A'.

In the drawings the rail L is shown as being mounted on a wooden carrier L' supported on posts L². The lateral rollers U in this instance bear against the sides of the carrier L' but obviously where a heavier metal rail of greater depth is employed the rollers U may bear against the sides of this metal rail.

In Fig. 8 is shown an alternative arrangement for the brakes adapted to be used with the construction of apparatus shown in Figs. 9, 10 and 11. In this case the brakes are arranged to grip the sides of the rail two blocks K being employed for this purpose. Each of these blocks is pivoted at K² on the end of the brake rod. Each load carrying arm N is rigidly secured at one end to a corresponding brake block. When the brake rod is raised in the manner described above the brake blocks K will spread apart but on lowering the brake rod the weight will operate to move the load carrying arm N as levers about the pivot K² causing the brakes to grip the rail. To allow this movement of the load carrying arms N in this arrangement the suspension cords O are connected to the frame member A⁶.

As previously mentioned the apparatus is provided with a platform on which a person can stand in order to control the apparatus and operate the brakes. For the sake of clearness this platform is not indicated in the drawings but it is obvious that it may be arranged in various ways as found most convenient. In place of a platform a simple seat may be provided.

The apparatus may be employed for the transport of any material and though logs of trees and the like are more particularly referred to above yet it is to be understood that cars or trucks for the conveyance of passengers or goods of various kinds may be suspended from the load carrying members N or the frame of the vehicle in some suitable manner.

When employing the apparatus as for example for the transport of logs of wood it is convenient to place the load for either side on suitable tables which can be raised by jacks or otherwise. The load is tested on a light trial frame until an approximate balance is obtained when the transport device is run over the load and the load carrying members connected to the load in the manner described. The supporting platforms for the load are then removed and the transport device is free to start. In place of employing supporting tables for the load the lifting so as to clear the platform on which the load is initially placed may be effected by the lift necessary to take the brake blocks out of operation.

The apparatus is primarily intended to be hauled or run by gravity but power may be applied if desirable.

Other methods of suspending the load from the lateral arms may be employed in place of the pendent members more particularly described above. The particular arrangement employed will depend on the nature of the load to be carried by the apparatus.

The carrying wheels may be grooved or flanged or provided with flat treads when guide wheels may be employed bearing on the sides of the rail. The brakes may be arranged to operate on the wheels instead of on the rail if preferred.

What I claim as my invention and desire to secure by Letters Patent is:—

1. In apparatus for the transport of material on a single rail, the combination of a central frame, a truck pivoted at each end of the frame, a mounting for each truck pivot so that the truck can rock in a vertical plane, brake blocks carried by each truck, load carrying members, means for transmitting the weight of the load to the brake blocks and means for raising the brake blocks off the braking surface in opposition to the weight of the load.

2. In apparatus for the transport of material on a single rail, the combination of a central frame, a truck pivoted at each end of the frame, a mounting for each truck pivot so that the truck can rock in a vertical plane, brake blocks carried by each truck, load carrying members so connected to the brake blocks that the weight of the load is capable of transmission to the brake blocks and means for raising the brake blocks off the braking surface in opposition to the weight of the load as set forth.

3. In apparatus for the transport of material on a single rail, the combination of a central frame, a truck pivoted at each end of the frame, a mounting for each truck pivot so that the truck can rock in a vertical plane, brake blocks carried by each truck, load carrying members so mounted on the truck frames that the weight of the load is capable of transmission to the brake blocks and means for raising the load and brake blocks so that the latter are taken off the braking surface as set forth.

4. In apparatus for the transport of material on a single rail, the combination of a central frame, a truck pivoted at each end of the frame, a mounting for each truck pivot so that the truck can rock in a vertical plane, means for rocking each truck, brake blocks carried by each truck and load carrying members mounted on the truck frames so that the load tends to bring the brake blocks in contact with the braking surface as set forth.

5. In apparatus for the transport of material on a single rail the combination of a central frame, a truck pivoted at each end of the frame, brake blocks, lateral load carrying arms, means for attaching a load to the arms, means for transmitting the weight of the load to the brake blocks and means for raising the brake blocks off the braking surface in opposition to the weight of the load as set forth.

6. In apparatus for the transport of material on a single rail the combination of a central frame, a truck pivoted at each end of the frame, brake blocks, a carrier for each brake block, lateral load carrying arms articulated to the brake block carrier so that the weight of the load is capable of transmission to the brake blocks, means for attaching a load to the arms and means for raising the brake blocks off the braking surface in opposition to the weight of the load as set forth.

7. In apparatus for the transport of material on a single rail the combination of a central frame, a truck pivoted at each end of the frame, a mounting for each truck pivot so that the truck can rock in a vertical plane, brake blocks carried by each truck, lateral load carrying arms articulated to each truck so that the weight of the load is capable of transmission to the brake blocks, means for attaching a load to the arms and means for raising the brake blocks off the braking surface in opposition to the weight of the load as set forth.

8. In apparatus for the transport of material on a single rail the combination of a central frame, a truck pivoted at each end of the frame, a mounting for each truck pivot so that the truck can rock in a vertical plane, means for rocking each truck, brake blocks carried by each truck, lateral load carrying arms articulated to the truck frames so that the load tends to bring the brake blocks in contact with the braking surface and means for attaching a load to the arms as set forth.

9. In apparatus for the transport of material on a single rail, the combination of a central frame, a truck pivoted at each end of the frame, brake blocks, lateral load carrying arms, load attachment members pendent from each lateral load carrying arm and adjustable across each other on the load, means for transmitting the weight of the load to the brake blocks and means for raising the brake blocks off the braking surface in opposition to the load as set forth.

10. In apparatus for the transport of material on a single rail, the combination of a central frame, a truck pivoted at each end of the frame, brake blocks, lateral load carrying arms, load attachment members pendent from each lateral load carrying arm and adjustable across each other on the load, stay members articulated to the frame and each adjustable and coöperating with a set of load attachment members, means for transmitting the weight of the load to the brake blocks and means for raising the brake blocks off the braking surface in opposition to the load as set forth.

11. In apparatus for the transport of material on a single rail the combination of a central frame a truck pivoted at each end of the frame, brake blocks, lateral load carrying arms, load attachment members pendent from each load carrying arm and adjustable across each other on the load, means for connecting the load to the load attachment members and simultaneously fixing the load attachment members in each set in relation to each other, means for transmitting the weight of the load to the brake blocks and means for raising the brake blocks off the braking surface in opposition to the load as set forth.

12. In apparatus for the transport of material on a single rail the combination of a central frame, brake blocks, lateral load carrying arms, load attachment members pendent from each lateral load carrying arm and adjustable across each other on the load, stay members articulated to the frame and each adjustable and coöperating with a set of load attachment members, means for connecting the load to the load attachment members and simultaneously fixing the load attachment members in each set and the corresponding stay member in relation to each other, means for transmitting the weight of the load to the brake blocks and means for raising the brake blocks off the braking surface in opposition to the load as set forth.

13. In apparatus for the transport of material on a single rail the combination of a central frame, a truck pivoted at each end of the frame, brake blocks, a carrier for each brake block, lateral load carrying arm so connected to the brake block carriers that the weight of the load is capable of transmission to the brake blocks, load attachment members pendent from each lateral load carrying arm and adjustable across each other on the load and means for raising the brake blocks off the braking surface in opposition to the weight of the load as set forth.

14. In apparatus for the transport of material on a single rail the combination of a central frame, a truck pivoted at each end of the frame, brake blocks, a carrier for each brake block, lateral load carrying arms so connected to the brake block carriers that the weight of the load is capable of transmission to the brake blocks, load attachment members pendent from each lateral load carrying arm and adjustable across each other on the load, means for connecting the load to the load attachment members and simultaneously fixing the load attachment members in each set in relation to each other and means for raising the brake blocks off the braking surface in opposition to the weight of the load as set forth.

15. In apparatus for the transport of material on a single rail the combination of a central frame, a truck pivoted at each end of the frame, brake blocks, a carrier for each brake block lateral load carrying arms so connected to the brake block carriers that the weight of the load is capable of transmission to the brake blocks, load attachment members pendent from each lateral load carrying arm and adjustable across each other on the load, stay members articulated to the frame and each adjustable and coöperating with a set of load attachment members and means for raising the brake blocks off the braking surface in opposition to the weight of the load as set forth.

16. In apparatus for the transport of material on a single rail the combination of a central frame, a truck pivoted at each end of the frame, brake blocks, a carrier for each brake block lateral load carrying arms so connected to the brake block carriers that the weight of the load is capable of transmission to the brake blocks, load attachment members pendent from each lateral load carrying arm and adjustable across each other on the load, stay members articulated to the frame and each adjustable and coöperating with a set of load attachment members, means for connecting the load to the load attachment members and simultaneously fixing the load attachment members in each set and a corresponding stay member in relation to each other and means for raising the brake blocks off the braking surface in opposition to the weight of the load as set forth.

17. In apparatus for the transport of material on a single rail the combination of a central frame, a truck pivoted at each end of the frame, a mounting for each truck pivot so that the truck can rock in a vertical plane, brake blocks carried by each truck, lateral load carrying arms, load attachment members pendent from each lateral load carrying arm and adjustable across each other on the load means for transmitting the weight of the load to the brake blocks and means for raising the brake blocks off the braking surface in opposition to the load as set forth.

18. In apparatus for the transport of material on a single rail the combination of a central frame, a truck pivoted at each end of the frame, a mounting for each truck pivot so that the truck can rock in a vertical plane, brake blocks carried by each truck, lateral load carrying arms, load attachment members pendent from each lateral load carrying arm and adjustable across each other on the load, means for connecting the load to the load attachment members and simultaneously fixing the load attachment members in each set in relation to each other, means for transmitting the weight of the load to the brake blocks and means for raising the brake blocks off the braking surface in opposition to the load as set forth 19. In apparatus for the transport of material on a single rail the combination of a central frame, a truck pivoted at each end of the frame, a mounting for each truck pivot so that the truck can rock in a vertical plane, brake blocks carried by each truck, lateral load carrying arms, load attachment members pendent from each lateral load carrying arm and adjustable across each other on the load, stay members articulated to the frame and each adjustable and coöperating with a set of load attachment members, means for transmitting the weight of the load to the brake blocks and means for raising the brake blocks off the braking surface in opposition to the load as set forth.

20. In apparatus for the transport of material on a single rail the combination of a central frame, a truck pivoted at each end of the frame, a mounting for each truck pivot so that the truck can rock in a vertical plane, brake blocks carried by each truck, lateral load carrying arms, load attachment members pendent from each lateral load carrying arm and adjustable across each other on the load, stay members articulated to the frame and each adjustable coöperating with a set of load attachment members, means for connecting the load to the load attachment members and simultaneously fixing the load attachment members in each set and the corresponding stay members in relation to each other, means for transmitting the weight of the load to the brake blocks and means for raising the brake blocks off the braking surface in opposition to the load as set forth.

21. In apparatus for the transport of material on a single rail the combination with a central frame, a truck pivoted at each end of the frame, a mounting for each truck pivot so that the truck can rock in a vertical plane, means for rocking each truck, brake blocks carried by each truck, lateral load carrying arms mounted on the truck frames so that the load tends to rock the truck and bring the brake blocks in contact with the braking surface and load attachment members pendent from each lateral load carrying arm and adjustable across each other on the load as set forth.

22. In apparatus for the transport of material on a single rail the combination with a central frame, a truck pivoted at each end of the frame, a mounting for each truck pivot so that the truck can rock in a vertical plane, means for rocking each truck, brake blocks carried by each truck, lateral load carrying arms mounted on the truck frames so that the load tends to rock the truck and bring the brake blocks in contact with the braking surface, load attachment members pendent from each lateral load carrying arm and adjustable across each other on the load and means for connecting the load to the load attachment members and simultaneously fixing the load attachment members in each set in relation to each other as set forth.

23. In apparatus for the transport of material on a single rail the combination of a central frame, a truck pivoted at each end of the frame a mounting for each truck pivot so that the truck can rock in a vertical plane, means for rocking each truck, brake blocks carried by each truck, lateral load carrying arms mounted on the truck frames so that the load tends to rock the truck and bring the brake blocks in contact with the braking surface, load attachment members pendent from each lateral load carrying arm, and adjustable across each other on the load and stay members articulated to the frame and each adjustable and coöperating with a set of load attachment members as set forth.

24. In apparatus for the transport of material on a single rail the combination of a central frame, a truck pivoted at each end of the frame, a mounting for each truck pivot so that the truck can rock in a vertical plane, means for rocking each truck, brake blocks carried by each truck, lateral load carrying arms mounted on the truck frames so that the load tends to rock the truck and bring the brake blocks in contact with the braking surface, load attachment members pendent from each lateral load carrying arm and adjustable across each other on the load, stay members articulated to the frame and each adjustable and coöperating with a set of load attachment members, and means for connecting the load to the load attachment members and simultaneously fixing the load attachment members in each set and the corresponding stay member in relation to each other as set forth.

25. In apparatus for the transport of material on a single rail the combination of a central frame, a truck pivoted at each end of the frame, a mounting for each truck pivot so that the truck can rock in a vertical plane a member upwardly projecting from each truck frame, a rod one end of which is pivotally connected to this projecting member, means for applying power to the other end of the rod whereby the upwardly projecting truck frame member is operated so as to rock the truck, brake blocks carried by each truck and load carrying members mounted on the truck frames so that the load tends to bring the brake blocks in contact with the braking surface as set forth.

26. In apparatus for the transport of material on a single rail the combination of a central frame, a truck pivoted at each end of the frame, a mounting for each truck pivot so that the truck can rock in a vertical plane a member upwardly projecting from each truck frame, a rod one end of which is pivotally connected to this projecting member, means for applying power to the other end of the rod whereby the upwardly projecting truck frame member is operated so as to rock the truck, brake blocks carried by each truck, lateral load carrying arms articulated to the truck frames so that the load tends to bring the brake blocks in contact with the braking surface and means for attaching a load to the arms as set forth.

27. In apparatus for the transport of material on a single rail the combination of a central frame, a truck pivoted at each end of the frame, a mounting for each truck pivot so that the truck can rock in a vertical plane, a member upwardly projecting from each truck frame, a rod one end of which is pivotally connected to this projecting member, a guide carried by the central frame for the other end of the rod, means for applying power to this end of the rod and moving it along the guide whereby the upwardly projecting truck frame member is operated so as to rock the truck, brake blocks carried by each truck and load carrying members mounted on the truck frames so that the load tends to rock the truck and bring the brake blocks in contact with the braking surface as set forth.

28. In apparatus for the transport of material on a single rail the combination of a central frame, a truck pivoted at each end of the frame, a mounting for each truck pivot so that the truck can rock in a vertical plane, a member upwardly projecting from each truck frame, a rod one end of which is pivotally connected to this projecting member, means for applying power to the other end of the rod whereby the upwardly projecting truck frame member is operated so as to rock the truck brake blocks carried by each truck, lateral load carrying arms mounted on the truck frames so that the load tends to rock the truck and bring the brake blocks in contact with the braking surface and load attachment members pendent from each lateral load carrying arm and adjustable across each other on the load as set forth.

29. In apparatus for the transport of material on a single rail the combination of a central frame, a truck pivoted at each end of the frame, a mounting for each truck pivot so that the truck can rock in a vertical plane, a member upwardly projecting from each truck frame, a rod one end of which is pivotally connected to this projecting member, means for applying power to the other end of the rod whereby the upwardly projecting truck frame member is operated so as to rock the truck, brake blocks carried by each truck lateral, load carrying arms mounted on the truck frames so that the load tends to rock the truck and bring the brake blocks in contact with the braking surface, load attachment members pendent from each lateral load carrying arm and adjustable across each other on the load and means for connecting the load to the load attachment members and simultaneously fixing the load attachment members in each set in relation to each other as set forth.

30. In apparatus for the transport of material on a single rail the combination of a central frame, a truck pivoted at each end of the frame, a mounting for each truck pivot so that the truck can rock in a vertical plane, a member upwardly projecting from each truck frame, a rod one end of which is pivotally connected to this projecting member, a guide carried by the central frame for the other end of the rod, means for applying power to this end of the rod and moving it along the guide whereby the upwardly projecting truck frame member is operated so as to rock the truck, brake blocks carried by each truck, lateral load carrying arms mounted on the truck frames so that the load tends to rock the truck and bring the brake blocks in contact with the braking surface and load attachment members pendent from each lateral load carrying frame and adjustable across each other on the load as set forth.

31. In apparatus for the transport of material on a single rail, the combination of a central frame, a truck pivoted at each end of the frame, a mounting for each truck pivot so that the truck can rock in a vertical plane, a member upwardly projecting from each truck frame, a rod one end of which is pivotally connected to this projecting member a guide carried by the central frame for the other end of the rod, means for applying power to this end of the rod and moving it along the guide whereby the upwardly projecting truck frame member is operated so as to rock the truck, brake blocks carried by each truck, lateral load carrying arms mounted on the truck frames so that the load tends to rock the truck and bring the brake blocks in contact with the braking surface, load attachment members pendent from each lateral load carrying frame and adjustable across each other on the load and means for connecting the load to the load attachment members and simultaneously fixing the load attachment members in each set in relation to each other as set forth.

32. In apparatus for the transport of material on a single rail the combination of a central frame, a truck pivoted at each end of the frame, a mounting for each truck pivot so that the truck can rock in a vertical plane, a member upwardly projecting from each truck frame, a rod one end of which is pivotally connected to this projecting rod, means for applying power to the other end of the rod whereby the upwardly projecting truck frame member is operated so as to rock the truck, brake blocks carried by each truck, lateral load carrying arms mounted on the truck frames so that the load tends to rock the truck and bring the brake blocks in contact with the braking surface, load attachment members pendent from each lateral load carrying arm and adjustable across each other on the load and stay members articulated to the frame and each adjustable and coöperating with a set of load attachment members as set forth.

33. In apparatus for the transport of material on a single rail the combination of a central frame, a truck pivoted at each end of the frame, a mounting for each truck pivot so that the truck can rock in a vertical plane, a member upwardly projecting from each truck frame, a rod one end of which is pivotally connected to this projecting member, means for applying power to the other end of the rod whereby the upwardly projecting truck frame member is operated so as to rock the truck, brake blocks carried by each truck, lateral load carrying arms mounted on the truck frames so that the load tends to rock the truck and bring the brake blocks in contact with the braking surface, load attachment members pendent from each lateral load carrying arm and adjustable across each other on the load, stay members articulated to the frame and each adjustable and coöperating with a set of load attachment members and means for connecting the load to the load attachment members and simultaneously fixing the load attachment members in each set and the corresponding stay member in relation to each other as set forth.

34. In apparatus for the transport of material on a single rail the combination of a central frame a truck pivoted at each end of the frame, a mounting for each truck pivot so that the truck can rock in a vertical plane, a member upwardly projecting from each truck frame, a rod one end of which is pivotally connected to this projecting member, a guide carried by the central frame for the other end of the rod, means for applying power to this end of the rod and moving it along the guide whereby the upwardly projecting truck frame member is operated so as to rock the truck, brake blocks carried by each truck lateral load carrying arms mounted on the truck frames so that the load tends to rock the truck and bring the brake blocks in contact with the braking surface, load attachment members pendent from each lateral load carrying frame and adjustable across each other on the load and stay members articulated to the brake and each adjustable and coöperating with a set of load attachment members as set forth.

35. In apparatus for the transport of material on a single rail the combination of a central frame, a truck pivoted at each end of the frame, a mounting for each truck pivot so that the truck can rock in a vertical plane, a member upwardly projecting from each truck frame, a rod one end of which is pivotally connected to this projecting member, a guide carried by the central frame for the other end of the rod, means for applying power to this end of the rod and moving it along the guide whereby the upwardly projecting truck frame member is operated so as to rock the truck, brake blocks carried by each truck, lateral load carrying arms mounted on the truck frames so that the load tends to rock the truck and bring the brake blocks in contact with the braking surface, load attachment members pendent from each lateral load carrying arm and adjustable across each other on the load, stay members articulated to the brake and each adjustable and coöperating with a set of load attachment members, means for connecting the load to the load attachment members and simultaneously fixing the load attachment members in each set and a corresponding stay member in relation to each other as set forth.

Dated at Rangoon Burmah this 14th day of March, 1908.

RICHARD WILLIAM SHREWSBURY.

In the presence of two witnesses:
C. F. CLIFTON,
YEO BA BA.